UNITED STATES PATENT OFFICE.

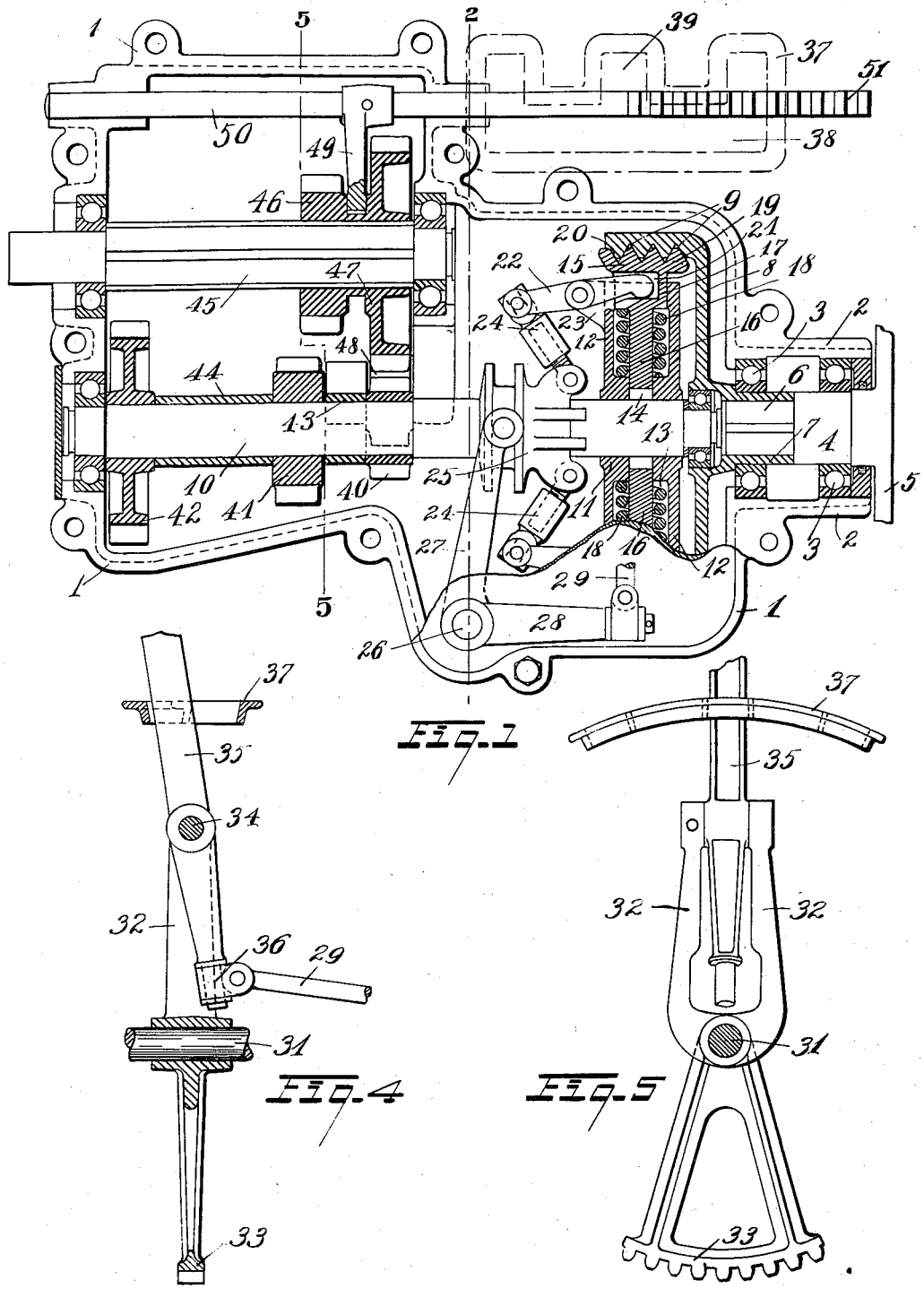

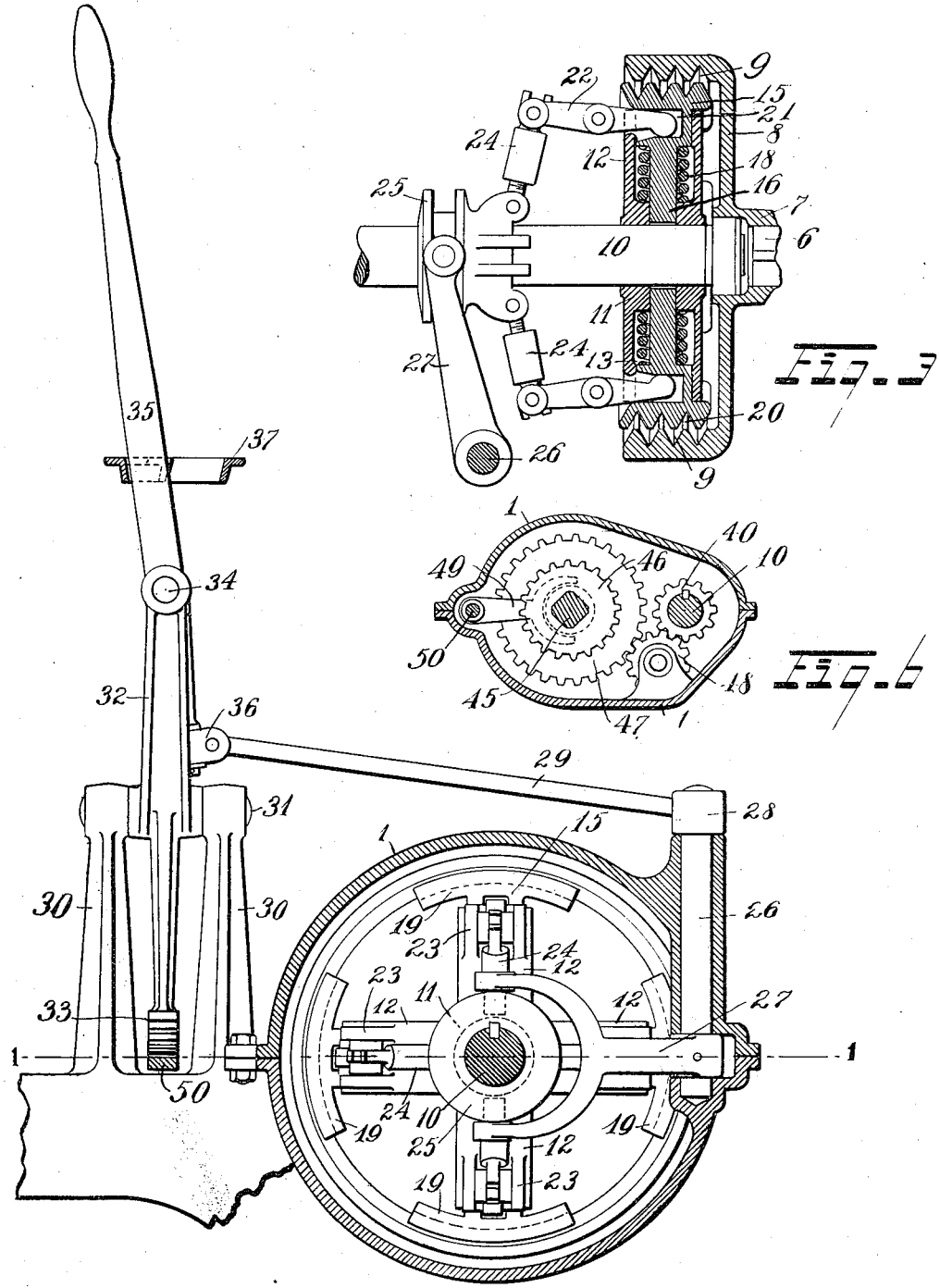

ALBERT F. MAIS, OF CLEVELAND, OHIO.

POWER-TRANSMITTING MECHANISM.

981,934.  Specification of Letters Patent.  Patented Jan. 17, 1911.

Application filed March 27, 1907. Serial No. 364,885.

*To all whom it may concern:*

Be it known that I, ALBERT F. MAIS, a subject of the Emperor of Germany, residing at Cleveland, in the county of Cuyahoga and State of Ohio, have invented a certain new and useful Improvement in Power-Transmitting Mechanism, of which the following is a full, clear, and exact description, reference being had to the accompanying drawings.

This invention relates to power transmitting mechanism and it has particular reference to an improved form of clutch and change of speed device, said clutch and device being so connected and related that the speed can not be changed without first disengaging the clutch.

The object of my invention, therefore, is to produce a device of the character stated in which it will be impossible to shift the change of speed gears without having previously unclutched the driving mechanism, so that when the said gears are again reëngaged the clutch will not be operative, and all jerking and danger of breaking of gears is avoided.

A further object of the invention is to produce a clutch which shall be quick in action and which shall be self-adjustable.

With these objects in view I have produced the structure shown in the accompanying drawings, in which—

Figure 1 is a section taken centrally through Fig. 2 on the line 1—1 of said figure, the clutch being engaged; Fig. 2 is a section taken vertically on the line 2—2 of Fig. 1; Fig. 3 is a view of parts of the clutch, the same being disengaged; Fig. 4 is an edge elevation and Fig. 5 a side elevation of the clutch-operating and gear-shifting mechanism; and Fig. 6 is a sectional view taken vertically through Fig. 1 on the line 5—5, the parts being on a somewhat smaller scale.

Taking up a more detailed description of the invention by reference to the drawings, in which the same reference characters designate the same parts throughout the several views, 1 represents the main casing containing the clutch and the gear-shifting mechanism, said casing being preferably divided on a horizontal line, as shown, so that access to the interior mechanism may be readily secured. At one end of the casing the latter is provided with a tubular extension 2, which extension contains a double set of ball bearings 3, 3 forming a journal for the main drive shaft 4. This drive shaft is provided outside of the casing with a coupling member 5 by means of which the drive shaft may be attached to the engine or motor shaft in any suitable manner.

To the inner end 6 of the drive shaft is secured a clutch member 8, said member being within the casing 1 and rotating with the main drive shaft 4. The member 8 is in the form of a disk having a laterally extending flange, said flange being provided on its inner perimeter with a plurality of parallel grooves 9, said grooves extending about said flange and having their sides beveled, as shown in Figs. 1 and 3.

Within the clutch member 8, and in axial alinement with the main drive shaft 4, I journal a shaft 10, the end of the shaft opposite the clutch member being suitably journaled in the end of the casing 1. Keyed or otherwise secured to the shaft 10 is a part 11 having a plurality of radial arms 12, said arms being provided with longitudinal bores 13 throughout the greater portion of their length, and with smaller bores 14 at the inner end of the arms, as shown in Fig. 1. Guided within the hollow arms 12 are clutch members 15, said members each having a stem 16 that fits within the bore 14, and an enlarged head 17 that fits within the larger bore 13 of the hollow arms. Between the bottom of the bore 13 and the head 17 of the clutch member I provide a coil spring 18, said spring tending to force outwardly the clutch member 15. The outer end of each of these clutch members is provided with an elongated shoe 19, said shoes having formed on their outer perimeters grooves 20 corresponding in shape with the grooves 9 on the inner face of the clutch member 8.

The portions of the shoes between the grooves 20 project into and fit the inclined sides of the grooves 9 of the clutch member 8, so that, when the springs 18 are permitted to exert their power to press the shoes 19 into engagement with the outer clutch member, the shaft 10 will be driven with the main shaft 4. Any desired number of the shoes 19 may be employed, the drawings showing four of such shoes. Also, any required strength of spring 18 may be employed, and instead of using one spring for each of the shoes 19, additional springs arranged concentrically or in any other suitable manner may be employed.

At one of their sides the heads 17 of the clutch members 15 are provided with sockets 21, into which project the ends of rocking levers 22 that are pivoted upon brackets 23 projecting from the hollow arms 12. The outer ends of the levers 22 are joined by links 24 to a clutch shifting collar 25 that is mounted upon the shaft 10 so as to turn with said shaft but be capable of longitudinal movement thereon.

Secured to a rock shaft 26 that is journaled in the frame 1 is a clutch shifting lever 27, said lever being bifurcated and having inwardly projecting pins that extend into a groove in the shifting collar, so that when the shaft 26 is rocked the said collar will be moved back and forth on the shaft 10. This shaft is rocked by a crank arm 28 that is secured thereto outside of the casing, and said crank arm is moved through the medium of a link 29 by mechanism now to be described.

Mounted in stationary brackets 30, is a short shaft 31, and pivoted on said shaft is a gear shifting member, said member having two substantially parallel arms 32, 32 extending in one direction from the shaft 31, and a gear segment 33 on the opposite side of said shaft. (See Fig. 5.) Extending between the ends of the arms 32 is a pivot pin or shaft 34 upon which is mounted a rocking lever 35, the lower end of which is connected by a universal joint 36 to the shifting rod 29, heretofore described. The rocking lever 35 is in reality a hand-operated lever, the same being adapted to be grasped by the hand of the operator and rocked in two planes at right angles to each other, the pivot shafts 31 and 34 providing for this movement. For holding the lever 35 in any one of its several positions, I provide a segment or guide plate 37, the outline of which is indicated in dotted lines in Fig. 1 of the drawing. As shown in said figure, it is in the form of an open frame having an interior slot 38 that is straight along one of its sides and has on its opposite side lateral extensions 39 that project into corresponding extensions in the side wall of the segment. The extensions 39 are of a width such as will receive and hold against movement the hand lever 35. When this lever is within an extension of the segment, the clutch shoes 19 are in engagement with the clutch member 8, and a driving relation is maintained between the main shaft and shaft 10. In order to move the hand lever from one of the extensions 39 to another, it is of course necessary to move the lever into the straight part of the slot 38, and in doing so the lower end of the hand lever 35 draws backwardly on the rod 29 thereby rocking the shaft 26 and the shifting arm 27, so that the latter pulls the shifting collar 25 in a direction to straighten the links 24. These links in turn rock the levers 22 and cause the inner ends of the latter to force inwardly the clutch members 15 and draw the shoes 19 out of engagement with the outer clutch member 8. It will be seen, therefore, that in order to shift the hand lever 35 from one part of the segment to another, it is necessary to rock the lever in such a manner as will disconnect the clutch. The advantages of this construction will be apparent from the description now to be given of the change of speed devices.

Keyed or otherwise secured to the shaft 10 are pinions 40, 41, and 42, said pinions being suitably spaced by sleeves or collars 43 and 44. Mounted upon a squared shaft 45 that is suitably journaled in the main casing 1 is a double gear, the smaller portion of which is represented at 46 and the larger part at 47. The part 46 of this gear is adapted to be brought into mesh with the gear 42 on the shaft 10, and the gear 47 is likewise adapted to be brought into mesh with the gear 41 on said shaft. When the double gear is moved to its extreme inward position opposite the gear 40, it is brought into mesh with an idler pinion or gear 48 that is journaled in the main casing and is maintained in mesh with the gear 40. See Fig. 6. When the latter gear is transmitting the power, therefore, the shaft 45 will be turned in an opposite direction to that which it will take when driven by either of the gears 41 and 42; and as said gear 40 is of smaller diameter than either of the other of said gears, the shaft 45 will be driven more slowly by it. Also, the gear 41 being smaller than the gear 42 the shaft 45 will turn more slowly when driven by the said gear 41 than if driven by the larger gear.

The double gear is shifted along on the squared shaft 45 by means of a shifting yoke 49 that is pinned or otherwise secured to a shifting rack 50, said rack being properly guided in the casing 1. At its outer end the rack is provided with teeth 51 which mesh with the teeth on the segment 33. As the hand lever 35 is moved from one of the extensions 39 of the slot to another, the segment 33 will be rocked upon its shaft 31, and the rack 51 will be moved to shift the double gear 46, 47. Inasmuch as the hand lever 35 normally rests within one or the other of the extensions 39 of the slot 38 and cannot be removed from said extension without disengaging the clutch, it will be seen that it is impossible to change the speed by shifting the gear until after the clutch has been disengaged. This absolutely avoids the trouble heretofore experienced in having gears shifted from one speed to another while the clutch mechanism is still in engagement, which has often resulted in breaking the gears or of jerking the mechanism so as to injure other parts of the structure. It will also be seen that it will be impossible to engage the clutch except when the change of speed gears are in perfect mesh. This avoids a common breakage of gears which is due to throwing the clutch into engagement while the gears are only partly in mesh.

While I have described the shafts 4 and 10 as drive and driven shafts respectively, it will be apparent that the power may be applied to the latter shaft and transmitted through the clutch to the shaft 4, in which case the latter shaft will become the driven shaft. As the clutch is held in driving condition by the springs 18, it is not a positive clutch, but is capable of yielding to excessive strains and it thereby avoids danger of breakage when such strains are thrown upon it. Also, the clutch is self-adjustable, for the reason that as the engaging surfaces of the members 8 and 15 wear, the springs 18 will still throw these members into driving relation, the open ended slot in the links 24 permitting this action. When the shifting collar 25 is moved backwardly to disengage the clutch, the links 24 will be thrown past their radial positions so that the springs 18 will tend to throw the collar still farther back, which will hold the hand lever 35 out of engagement with the extensions or recesses 39 in the slot 38. See Fig. 3. The same springs, therefore, that hold the clutch members in engagement also hold said members out of engagement.

While my invention is especially applicable to automobiles, it will be seen that it is capable of much more general application.

Various changes in the details of construction may be made without departing from the spirit of my invention, and the following claims are not intended to be limited to said details any further than is rendered necessary by their express terms or by the prior state of the art.

I claim:

1. In power transmitting mechanism, a driving member, a driven member, a clutch connecting said members, change of speed devices connected with the driven member, said devices including a shifting gear wheel, a sliding rack for moving said gear wheel, a pivoted hand lever having a gear segment meshing with said rack, connections between said hand lever and the clutch, and means coöperating with and guiding said hand lever, said means preventing the operation of the rack until after the clutch has been disengaged.

2. In power transmitting mechanism, a drive shaft, a driven shaft, a clutch connecting said shafts, change of speed gears connected with the driven shaft, a shifting gear wheel, a sliding rack for moving said gear wheel, a pivoted hand lever having a gear segment meshing with said rack, connection between said hand lever and the clutch, and means coöperating with and guiding said hand lever, said means preventing the operation of the rack until after the clutch has been disengaged.

3. In a power transmitting mechanism, a driving member, a driven member, a clutch connecting said members, change speed devices connected with the driven member, said devices including a shifting gear wheel, a sliding rack for moving said gear wheel, a pivoted lever having a gear segment meshing with the said rack, a hand lever pivoted upon the first mentioned lever and adapted to move in a plane at right angles to the plane of movement of the first mentioned lever, and means preventing the operation of the rack until after the clutch has been disengaged.

In testimony whereof, I hereunto affix my signature in the presence of two witnesses.

ALBERT F. MAIS.

Witnesses:
S. E. FOUTS,
J. B. HULL.